Patented Jan. 19, 1932

1,841,754

UNITED STATES PATENT OFFICE

JOSEF MARTIN MICHEL, OF BITTERFELD, GERMANY, ASSIGNOR TO I. G. FARBENINDUSTRIE AKTIENGESELLSCHAFT, OF FRANKFORT-ON-THE-MAIN, GERMANY

METHOD OF PURIFYING OILS

No Drawing. Application filed November 7, 1930, Serial No. 494,190, and in Germany November 13, 1929.

The present invention relates to a method of removing certain contaminations, particularly phosphorus, from oils.

The problem of freeing oils from contaminating phosphorus generally arises in connection with the use of oils as lubricating or sealing media in apparatus for producing or handling phosphorus or phosphorus containing gases, said oils, in the course of time, taking up certain quantities of phosphorus. However, the application of the present invention is not limited to the purification of such oils.

According to the present invention the oil, for the purpose of purification, is treated with a metal or metals, preferably in powdered form, at temperatures not far below the boiling point of the oil. Advantageously such metals are selected for the treatment as have a sufficient affinity to phosphorus to form metal phosphides at relatively low temperatures. In order to prevent oxidation of the phosphorus during the treatment, the process is carried out in an indifferent atmosphere by continually stirring the mixture.

For attaining the purpose of the present invention, I preferably employ powdered copper or fine copper borings. After sufficient duration of contact, there results an oil which is entirely free of phosphorus and with respect to all its physical properties is entirely identical with the original oil. At the same time the phosphorus is obtained in the form of copper phosphorus which may be employed in the well known manner for improving the quality of bronze and similar castings, as its percentage content in phosphorus can be easily regulated between about 6-25 percent of phosphorus by carrying out the treatment with the corresponding quantity of copper.

Examples (1) To 100 liters of mineral oil, as employed in transformers, having a specific weight of about 0.905 and containing 0.25 percent of phosphorus, 1 kg. of copper borings (150 mesh per square centimeter) are added and the mixture heated nearly to boiling temperature, while constantly stirring and passing an indifferent gas over the mixture. After allowing the latter to react for about 1 or 2 hours, the oil is discharged from the vessel and filtered. The copper phosphide remaining on the filter is then washed once or twice with benzene so as to remove the last traces of oil.

The oil obtained is free from phosphorus and retains all its original qualities. The copper phosphide yield amounts to about 1.2 kgs. containing 18.3 percent of phosphorus.

(2) To 100 liters of tar-oil (employed as a sealing medium in gasometers for phosphorus containing gases) containing 0.73 percent of phosphorus, 3 kgs. of powdered copper are added, while continually stirring and passing an inert gas over the mixture heated to just below its boiling point. After a reaction period of about 2 hours the oil is discharged and filtered and the copper phosphide washed in the usual manner. The oil is free from phosphorus and can be immediately put to further use. The copper phosphide yield amounts to about 3.8 kgs. containing about 21 per cent of phosphorus.

I claim:

1. A method of purifying oils contaminated by phosphorus, which comprises contacting a phosphorus containing oil with a metal capable of reacting with phosphorus in finely comminuted form at elevated temperatures not far below the boiling point of said oils, and separating the phosphide formed from said oil.

2. A method of purifying oils contaminated by phosphorus, which comprises contacting a phosphorus containing oil with copper in finely comminuted form at elevated temperatures not far below the boiling point of said oils, and separating the phosphide formed from said oil.

In testimony whereof, I affix my signature.

JOSEF MARTIN MICHEL.